United States Patent
Klauke et al.

[15] 3,694,444
[45] Sept. 26, 1972

[54] FLUOROPYRIMIDINES

[72] Inventors: Erich Klauke, Odenthal-Hahnenberg; Hans-Samuel Bien, Burscheid, both of Germany

[73] Assignee: Farbenfabriken Bayer Aktiengesellschaft, Leverkusen, Germany

[22] Filed: Nov. 1, 1967

[21] Appl. No.: 679,652

[30] Foreign Application Priority Data

Dec. 16, 1966 Germany..................F 50972

[52] U.S. Cl..................260/251 R, 252/51, 260/999
[51] Int. Cl. ............................................C07d 51/36
[58] Field of Search.....................................260/251

[56] References Cited

FOREIGN PATENTS OR APPLICATIONS 1,440,673  4/1966  France

OTHER PUBLICATIONS

C.A. 65, 3869 (1966) Protsenko et al.

Primary Examiner—Alex Mazel
Assistant Examiner—R. V. Rush
Attorney—Plumley, Tyner and Sandt

[57] ABSTRACT

A process of the preparation of fluoro substituted pyrimidines useful as lubricants, dyestuffs, pharmaceutical agents and pesticides which includes the isolated monofluoro-trichloro- and difluoro-dichloropyrimidines by reacting polyhalopyrimidines with hydrofluoric acid under increased temperature and pressure.

1 Claim, No Drawings

FLUOROPYRIMIDINES

The production of fluorinated pyrimidines by exchanging the chlorine atoms in tetrachloropyrimidine for fluorine is known. In the literature, silver fluoride (Am. Soc. 82, 4115 [1960]) and alkali metal fluorides (Belgian Pat. Specification No. 660,907) are described as fluorinating agents.

Whereas the use of silver fluoride is not taken into consideration for industrial processes for reasons of costs, the use of, for example, potassium fluoride, as described in the Belgian Patent Specification, is a technically interesting and feasible process. Consequently, a fairly large number of publications have discussed the use of alkali fluorides as fluorinating agents for aromatic compounds, such as hexachlorobenzene and pentachloropyridine, by the exchange of chlorine for fluorine.

A survey of these reactions can be found, inter alia, in A. K. Barbour, P. Thomas, Ind.eng.Chem. 58 [1966], 48–55.

The fluorination of cyanuric chloride, i.e. of an acid chloride, with, inter alia, anhydrous hydrofluoric acid, is described in German Pat. Specification No. 1,044,091. In the special example of execution, $SbCl_5$ is used as catalyst for this fluorination. The fact that this instruction explicitly uses a catalyst indicates that, even in the fluorination of an acid chloride in which the Cl to be exchanged is substantially more reactive, compared with the genuinely aromatically linked chlorine substituent, a reaction with hydrofluoric acid alone, i.e. without a catalyst, was not possible or not thought to be possible.

Surprisingly, it has now been found that in polyhalopyrimidines in which at least one of the halogen substituents in the 2-, 4- and/or 6-position is a chlorine or bromine substituent, as in 2,4,5,6-tetrachloro- or -bromo-pyrimidine and 2,4,6-trichloro- or -bromopyrimidine, chlorine or bromine substituents in the 2-, 4- and/or 6-position can be exchanged for fluorine atoms by the action of anhydrous hydrofluoric acid under comparatively gentle conditions and with high yields.

The process according to the invention is characterized in that polyhalopyrimidines in which at least one of the halogen substituents in the 2-, 4- and/or 6-position is a chlorine or bromine substituent, are reacted with anhydrous hydrofluoric acid at temperatures of 80° to 180° C and under increased pressure with the exchange of at least one chlorine or bromine substituent in the 2-, 4- and/or 6-position for a fluorine substituent.

As polyhalopyrimidines containing a chlorine or bromine substituent in the 2-, 4- and/or 6-position, 2,4,5,6-tetrachloropyrimidine and 2,4,6-trichloropyrimidine can primarily be used. The corresponding bromine derivatives are also usable. Furthermore it is possible to isolate the monofluorotrichloro and difluoro-dichloro or -bromo-pyrimidine compounds which are intermediarily formed in the reaction of tetrachloro- or tetrabromopyrimidine according to the invention and are, in part, known from other literature references, and to use them as starting compounds for another reaction with fluorohydric acid according to the invention.

The ranges of temperature preferred for the reaction according to the invention are 120° to 160° C and those of the pressure are 15 to 50 atm. excess pressure.

The reaction according to the invention can be carried out by first placing the polyhalopyrimidine, for example, tetrachloropyrimidine or trichloropyrimidine, into an autoclave of high quality steel fitted with stirrer, adding the anhydrous hydrofluoric acid and applying a slight protective pressure of an inert gas, such as nitrogen. The autoclave is then heated to the desired temperature. The gaseous hydrogen halide formed in the course of the reaction can escape via a release valve, possibly together with any excess protective gas, during or after the heating. The pressure is generally released at 35 to 45 atm. excess pressure. When the reaction is completed, the autoclave is cooled and released, and the content is worked up by distillation.

The product of the process is a mono- or polyfluoropyrimidine which may contain chlorine or bromine substituents. The number of fluorine substituents introduced depends on the duration of the reaction and the temperature applied. Fluoropyrimidines which still contain exchangeable chlorine or bromine substituents, can either be used as such for further reactions or they can be used as starting materials to another fluorination according to the process of the invention. It is possible, for example, to obtain difluoro-dichloropyrimidine and a trifluoro-monochloro-pyrimidine from monofluoro-trichloropyrimidine, and a trifluoro-monochloropyrimidine from difluoro-dichloropyrimidine. Chlorine or bromine substituents in the 5position of the pyrimidine ring are exchanged for a fluorine substituent only with difficulty, or not at all, due to their known reaction inertia.

Products which can be obtained by the present process are, for example, monofluoro-trichloropyrimidine and, if tetrachloropyrimidine is used, presumably 4-fluoro-2,5,6-trichloropyrimidine, difluoro-dichloropyrimidine, presumably 2,4-difluoro-5,6-dichloropyrimidine, and 2,4,6-trifluoro-5-chloropyrimidine. In general, mixtures of mono- and polyfluorinated pyrimidines are formed under the conditions of the process. However, it is always possible to produce one of the compounds as main component by a suitable selection of the reaction conditions. Reaction conditions affecting the composition of the products are, besides the temperature and the time, also the molar ratio of the starting components and the intensity with which the reaction mixture is mixed. The higher the molar ratio of anhydrous hydrofluoric acid to polyhalopyrimidine, the higher is the degree of fluorination which can be achieved under otherwise identical conditions. In general, a molar ratio HF to polyhalopyrimidine of 6 to 12 : 1 is preferred. It may sometimes be of advantage to go beyond or to remain below this molar ratio since, for example, a high excess of hydrofluoric acid reduces the solubility of the resultant hydrohalic acid, especially of hydrogen chloride, in the reaction mixture and thus favors the removal thereof from the reaction space. On the other hand, a lower molar ratio is advantageous for the preparation of the low stage of fluorination.

The products of the process are valuable preliminary products for the preparation of dyestuffs by condensing, for instance, 2 mols of amino group-containing dyestuffs with 1 mol of a difluoropyrimidine thus connecting the amino groups of the two dyestuff molecules via a pyrimidine bridge member. The products can likewise be used for the preparation of pharmaceutical agents and pest control agents. They can also be used as additives to lubricants.

Compared with the known reaction of chloropyrimidines with alkali metal fluorides, working with anhydrous hydrofluoric acid offers substantial advantages. The reaction proceeds in a homogeneous phase, since the polyhalopyrimidine used, for example, tetrachloropyrimidine, is dissolved in HF. During the exchange of a chlorine for a fluorine substituent, the consumed fluorinating agent HF is removed in the form of gaseous HCl and the excess HF is subsequently recovered by distillation.

EXAMPLE 1

A nickel autoclave of 0.5 liters capacity fitted with reflux condenser and stirrer is charged with 140 g tetrachloropyrimidine and 100 ml of anhydrous hydrofluoric acid, and a nitrogen pressure of 12 atm. excess pressure is applied. The autocalve is then heated to 130° C while stirring, and the reaction mixture is kept at this temperature for 10 hours. By means of a control valve arranged behind the reflux condenser, the pressure in the apparatus is kept between 22 and 25 atm. excess pressure by occasional release. Nitrogen and HCl escape during the release. After 10 hours, the autoclave is cooled to room temperature, the remaining pressure is released and the bulk of the unconsumed hydrofluoric acid is removed by applying a slight vacuum. The residue is distilled in a distillation apparatus of high quality steel. There are obtained 104 g of crude distillate of $n_D^{20} = 1.5170$ and 11 g of residue from distillation containing practically unchanged starting material. According to gas-chromatographic analysis, the crude distillate is composed as follows: 6.3 percent trifluoro-monochloropyrimidine, 38.8 percent difluoro-dichloropyrimidine, 46.8 percent monofluoro-trichloropyrimidine and 6.6 percent of unchanged tetrachloropyrimidine.

The components can be isolated therefrom by distillation; they have the following physical properties and yield the following values in the elementary analysis:
monofluoro-trichloropyrimidine: b.p. 195°C $n_D^{20} = 1.5392$ presumably 4-fluoro-2,5,6-trichloropyrimidine according to gas chromatography:
  90.5% monofluoro-trichloro-pyrimidine
  9.5% difluoro-dichloro-pyrimidine
calculated C 23.85 Cl 52.90 F 9.43 N 13.90
found 23.72 51.90 10.10 13.64
difluoro-dichloropyrimidine: b.p. 156° C $n_D^{20} = 1.4908$ presumably 2,4-difluoro-5,6-dichloropyrimidine
calculated C 25.93 Cl 38.40 F 20.53 N 15.15
found 26.21 37.65 20.70 15.15
2,4,6 trifluoro-5-chloropyrimidine: b.p. 116°C $n_D^{20} = 1.4390$ the following Table shows the influence of the various variable conditions on the composition of the reaction mixture:

| Mixture | Temp. °C | time hrs. | molar ratio HF/Py | $n_D^{20}$ crude dist. | 3F/ 1Cl | 2F/ 2Cl | 1F/ 3Cl | 4Cl |
|---|---|---|---|---|---|---|---|---|
| A | 130 | 10 | 8 | 1.5170 | 6.3 | 38.8 | 46.8 | 6.6 |
| B | 130 | 10 | 8 | 1.5008 | 13.5 | 43.1 | 34.9 | 2.5 |
| C | 150 | 10 | 8 | 1.4645 | 48.6 | 37.7 | 7.05 | 0.2 |
| D | 150 | 3 | 16 | 1.4495 | 71.8 | 19.9 | 2.00 | — |

A = slow stirring
B = intense shaking
C, D = rapid stirrer
Py = tetrachloropyrimidine

EXAMPLE 2

In an apparatus as described in Example 1, 100 g of a monofluoro-trichloropyrimidine obtained according to Example 1 and 80 ml HF are reacted at 160° C for 2 hours, while keeping the resultant HCl pressure at between 45 and 40 atm. excess pressure by occasional release. The mixture is worked up by distillation. There are obtained 77 g of a reaction product of $n_D^{20} = 1.5052$ which according to the gas chromatogram has the following composition.
  11 percent trifluoro-chloropyrimidine
  49.5 percent difluoro-dichloropyrimidine
  33.5 percent unchanged starting material.

EXAMPLE 3

In an autoclave as described in Example 1, 140 g of a difluoro-dichloropyrimidine obtained according to Example 1 and 90 ml HF are fluorinated at 160° C to 180° C for 2 hours. After distillation, there are obtained 124 g of a reaction product of $n_D^{20} = 1.4692$, which according to the gas chromatogram contains 46.7 percent trifluoro-chloropyrimidine.

EXAMPLE 4

123 g 2,4,6-trichloropyrimidine of $n_D^{20} = 1.5695$ are fluorinated with 120 ml HF (corresponding mole 1 : 9) in the manner described in the preceding Examples at 160° C for 3 hours. Working up by distillation yields a crude mixture of 84.5 g with a refractive index of 1.5030. The residue after distillation amounts to 16 g. The distillate has the following composition:
  11 percent trichloropyrimidine
  53 percent monofluoro-dichloropyrimidine
  30 percent difluoro-chloropyrimidine
  5 percent trifluoropyrimidine.

We claim:

1. A process for the preparation of fluoro-substituted pyrimidines which comprises reacting polyhalopyrimidines in which at least one of the halogen substituents in the 2-, 4- and/or 6-position is a chlorine or bromine substituent, with anhydrous hydrofluoric acid at a temperature of from about 80° C to about 180° C under increased pressure with the exchange of at least one chlorine or bromine substituent in the 2-, 4- and/or 6-position for a fluorine substituent.

* * * * *